B. DRAPER.
GAUGE, MORE PARTICULARLY FOR USE FOR GAUGING TAPERED HOLES.
APPLICATION FILED NOV. 1, 1919.
1,428,948.
Patented Sept. 12, 1922.
2 SHEETS—SHEET 1.
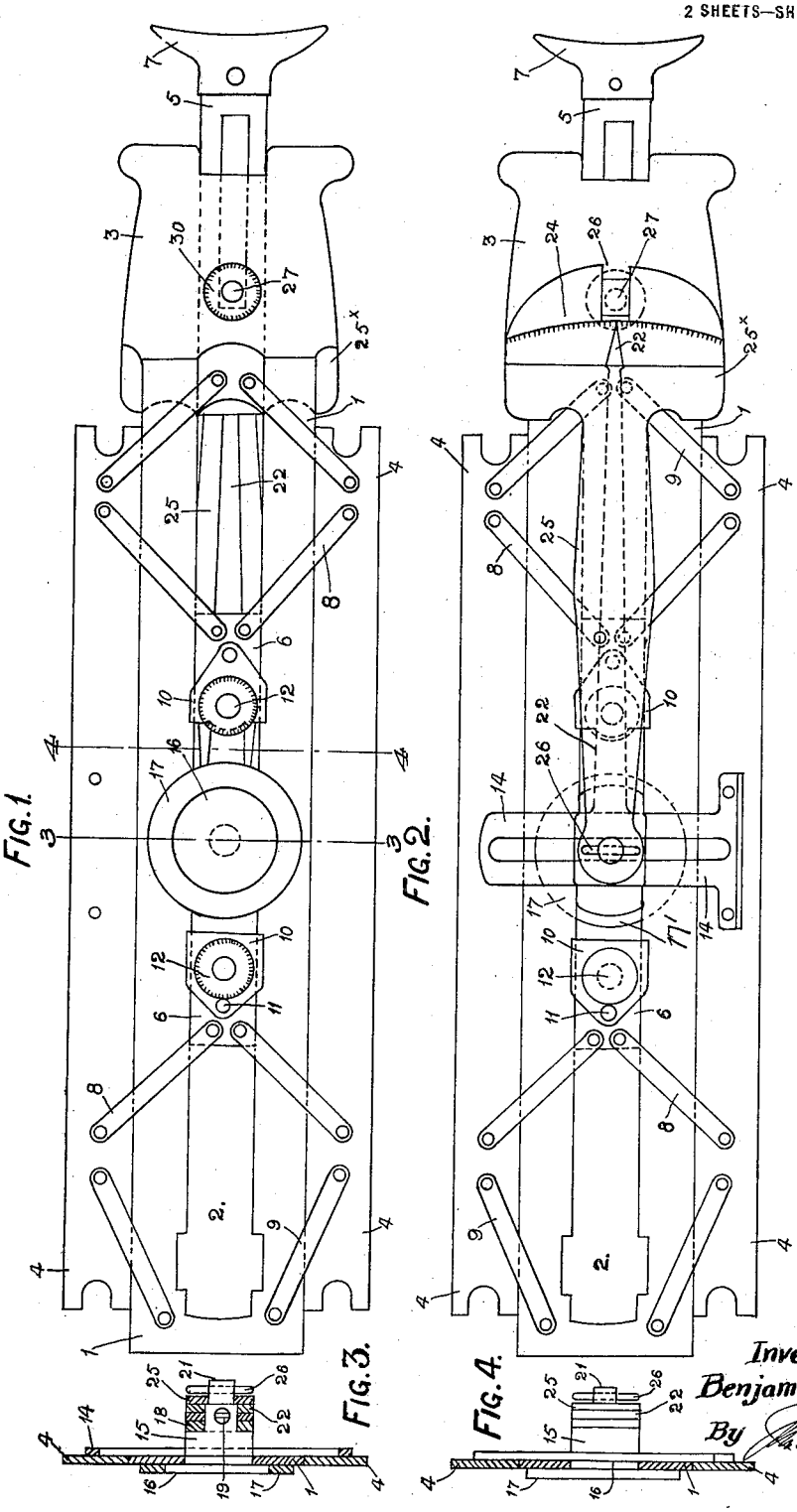
Inventor
Benjamin Draper
By
Atty B. DRAPER.
GAUGE, MORE PARTICULARLY FOR USE FOR GAUGING TAPERED HOLES.
APPLICATION FILED NOV. 1, 1919.
1,428,948.
Patented Sept. 12, 1922.
2 SHEETS—SHEET 2
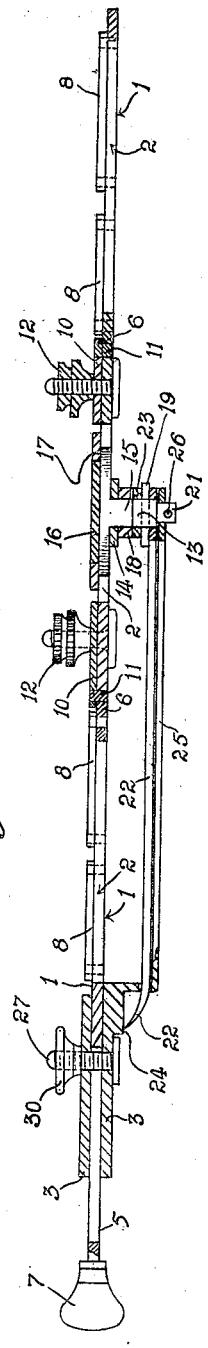
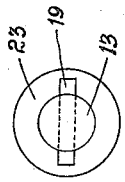
INVENTOR.
Benjamin Draper
Attorney.

Patented Sept. 12, 1922.

1,428,948

UNITED STATES PATENT OFFICE.

BENJAMIN DRAPER, OF LIVERPOOL, ENGLAND.

GAUGE, MORE PARTICULARLY FOR USE FOR GAUGING TAPERED HOLES.

Application filed November 1, 1919. Serial No. 335,088.

*To all whom it may concern:*

Be it known that I, BENJAMIN DRAPER, a subject of the King of England, residing at Everton, Liverpool, in the county of Lancaster, England, have invented new and useful Improvements in Gauges, More Particularly for Use for Gauging Tapered Holes, of which the following is a specification.

This invention has reference to gauges, and more particularly for gauging tapered holes, or tapered bodies, as for instance gauging holes in metal flanges or bodies into which tapered bolts, plugs, or the like have to be introduced, and fitted; and the object and effect of the present invention is to provide a gauge of this kind which is adjustable, and it is adapted to be set and fixed by inserting in the hole, either for making corresponding bolts or pins, or for gauging tapered holes that are being made to a set or gauged size, and like purposes.

In a gauge according to this invention, there is a main stationary member having at each side of it a movable gauging bar or member, which is adapted to be moved by a movable part sliding in connection with the main member, say in a slot along the middle of same; and to this main member the outer bars or members are connected by links at each end; and as the adjusting, that is, the movable sliding part is moved in or out, the outer movable gauge bars or members will be pressed by the links out and in, both at the back and leading ends. When this is done, the gauge bars will move outwards in gauging a tapered hole until they touch the surfaces of the hole; and when this has been done the slidable or movable member is clamped, whereupon the said movable bars are clamped and fixed, whereupon the gauge can be withdrawn, and the edges of the gauge bars or members will lie truly at the inclinations of the hole on both sides of its axis.

In connection with the gauge, there is employed an indicator, by which the angle or inclination, in which the gauge bars lie after taking a gauge, will be automatically indicated by the instrument.

The invention is illustrated in the accompanying drawings.

Figures 1 and 2 are face views showing the instrument viewed from opposite sides.

Fig. 3 is a section on line 3—3 of Fig. 1.

Fig. 4 is a section on line 4—4 of Fig. 1.

Fig. 5 is a longitudinal section through the gauge.

Fig. 6 is a section on line 6—6 of Fig. 5.

Fig. 7 is a plan of the saddle.

Fig. 8 is a plan of the washer and connecting pin.

Referring to the drawings, 1 is the stationary member consisting of two parallel bars or a plate having a central longitudinal slot 2 in it, and having at one end a handle portion 3. 4 are the two movable gauging bars or members; and 5, 6, are the movable slides adapted to slide longitudinally in the slot 2. The part 5 has a handle 7 by which it can be moved to and fro through the handle portion 3; and the sliding part 6 is connected with the outer gauging bars or members 4, by links 8, at each end of the instrument. The bars 4 are however, also connected near the points of connection of the links 8, with the stationary member 1, by other links 9; and these links are arranged on both sides of the instrument in the case shown.

It will be seen that the links 8 are, when the bars 4 are close to the stationary member 1, inclined outwards in opposite directions from the slide 6, and the links 9 are inclined in the opposite manner.

The slide 6 is provided with a clamping arrangement consisting of a plate 10 on each side of it, which plates overlap the edges of the metal on each side of the slot 2 of the stationary member 1, and are secured by a pin 11 to the slide 6; and through these clamping plates 10 a bolt and thumb nut clamping device 12 is passed, so that when the instrument is set, by screwing up the nuts on this device 12, the angular position of the gauging members 4 is fixed as above described.

The indicator mechanism comprises a slotted bar 14 fixed on one of the gauge members 4, through which is passed and works a slide 15 having parallel sides, and of the same width as the slot in the device 14, against the edges of which it works. This slide has a circular head 16, which rests in a recessed socket ring device 17, the inner part of which projects into the slot 2 as at 17′, Fig. 2, and is the same width as same; whilst the outer part overlaps the side members of the stationary member 1.

The head 16 of the slide 15 rests in the ring 17, and said slide 15 beyond the plate 1 is of angular form in cross section to seat in the slot of bar 14, to hold said slide against movement other than in said bar. A saddle 18, secured by a pin 19 to slide 15, overlies the bar 14 and prevents displacement of slide 15. An index finger 22 has one end fitted over the angular portion of slide 15, being thus fixed thereto, a washer 23 underlying the finger. A plate 25 is secured on the upper portion of the slide 15 by pin 26, said slide at this point being circular to permit turning of the slide without moving the plate. That end of the plate 25 remote from slide 15 has a stepped portion, presenting an upstanding wall and a part 24 in parallelism with the plate 25 but in a lower plane. The wall of plate 25 has a slot therethrough to permit the projection of the pointer or indicating end of finger 22 to cooperate with suitable scale workings in part 24.

The finger 22 is disposed and works under the plate 25, the indicating end only appearing over the index plate portion 24; and this offset end 25ˣ of this bar has a gap 26 through which passes the rectangular head 27 of a clamping screw device 30, by which the slide 5 is clamped to the handle portion 3. Thus, whilst the plate 25, 25ˣ, is prevented from moving laterally, it can move longitudinally by means of the slot and pin 26, 27, as the slide device 15 is moved longitudinally in the slot 2 in setting the instrument.

For most cases, the long arm 22 at the tip will give sufficient movement for being able to read clearly the angle on the portion 24, that is will enable angle divisions of sufficient magnitude to be easily read.

The instrument shown in Figures 1 to 4 is particularly adapted for use in connection with gauging of holes and the inclination or taper of same.

What is claimed is:—

1. An instrument for purposes as specified, comprising a stationary part, and a movable part operating therein, a movable gauge part connected with said stationary part and said movable part and adapted to be operated by said movable part in such a manner as to be used in connection with conical parts of machinery or work; substantially as herein set forth.

2. An instrument of the class described, comprising a stationary part having a handle and formed with a longitudinal slot, slides operating in the slot, a member operating through the handle and connected to one of said slides, gauging bars connected to said slides and to said stationary part, a dial, a pointer cooperating therewith, and means operated by one of said gauging bars for actuating the pointer.

3. An instrument of the class described, comprising a stationary part having a handle and formed with a longitudinal slot, slides operating in the slot, a member operating through the handle and connected to one of said slides, gauging bars connected to said slides and to said stationary part, a dial, a pointer cooperating therewith, a slotted bar connected to one of the gauging bars, and means operative in such slotted bar to operate the pointer.

In testimony whereof I have signed my name to this specification in the presence of two subscribing witnesses.

BENJAMIN DRAPER.

Witnesses:
 SOMERVILLE GOODALL.
 ELSIE E. JORDAN.